United States Patent [19]
Otto

[11] 3,971,851
[45] July 27, 1976

[54] METHOD OF MAKING LIVERWURST

[75] Inventor: Friedrich Otto, Hameln, Weser, Germany

[73] Assignee: A. Stephan u. Sohne, Hameln, Weser, Germany

[22] Filed: Dec. 19, 1974

[21] Appl. No.: 534,510

[30] Foreign Application Priority Data
Dec. 24, 1973  Germany............................ 2364485

[52] U.S. Cl................................ 426/646; 426/510; 426/518; 426/519
[51] Int. Cl.²........................................... A23K 1/00
[58] Field of Search .......... 426/644, 646, 641, 570, 426/518–520, 574, 105, 138, 284

[56] References Cited
UNITED STATES PATENTS

| | | | |
|---|---|---|---|
| 811,466 | 1/1906 | Williams............................. | 426/646 |
| 2,440,168 | 8/1948 | Cross................................... | 426/646 |
| 3,033,687 | 5/1962 | Harper................................ | 426/646 |
| 3,348,954 | 10/1967 | Green................................. | 426/646 |
| 3,563,764 | 2/1971 | Posegate............................. | 426/646 |

*Primary Examiner*—Norman Yudkoff
*Assistant Examiner*—Martin G. Mullen
*Attorney, Agent, or Firm*—Michael J. Striker

[57] ABSTRACT

Pork trimmings are continuously agitated in a vacuum while they are being subdivided into a mass of chunks into which saturated steam is thereupon admitted to cook them. While continuing the agitation, the cooking action is terminated when the temperature of the mass reaches about 125°C, and thereupon the mass is cooled to about 60°–95°C and is comminuted and emulsified under continuing agitation. Liver pieces and binder material are then added to the agitated mass and comminution continues to comminute the liver pieces while cooling the resulting mixture to about 40°–80°C and admitting liquid spices into it to obtain a spiced product.

8 Claims, 1 Drawing Figure

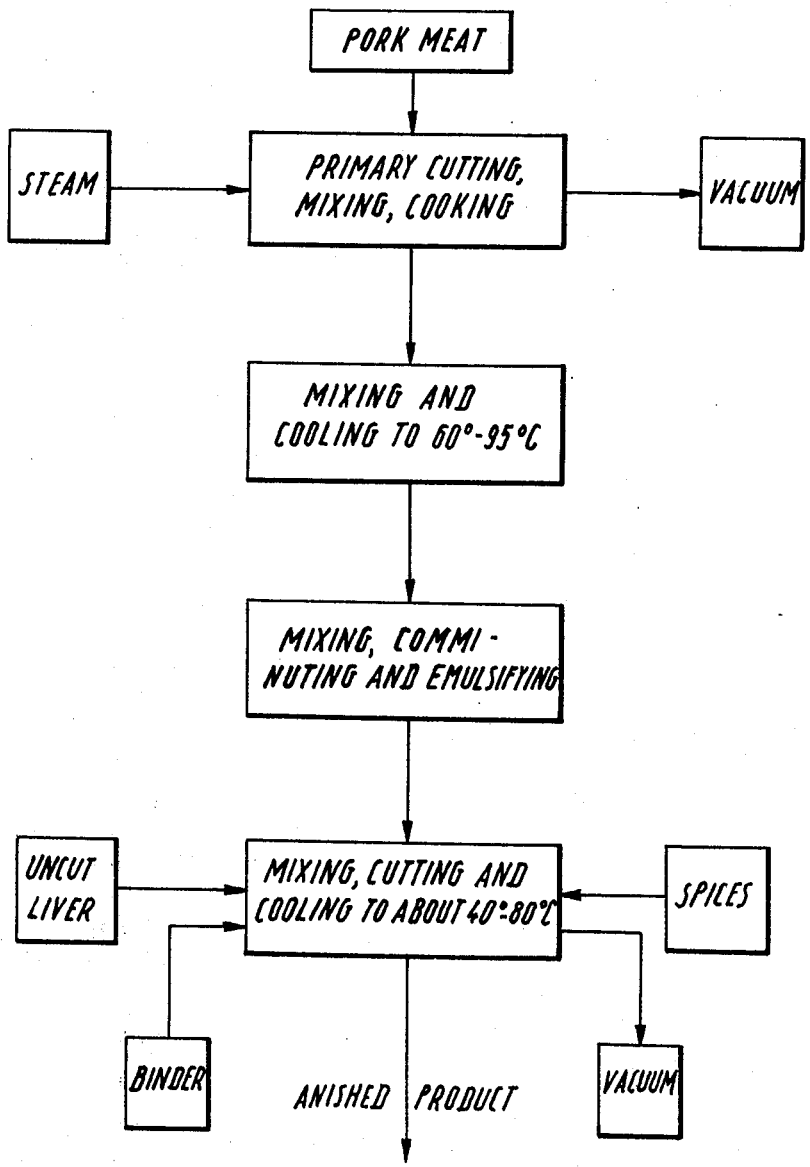

METHOD OF MAKING LIVERWURST

BACKGROUND OF THE INVENTION

The present invention relates generally to a method of making a meat product, and more particularly to a method of making liverwurst, liver paste and the like.

Liverwurst is conventionally made by comminuting pork trimmings, especially pieces of pork belly, and admixing them with liver and spices. The fat pieces of pork belly are conventionally scalded and cooked in open kettles at a temperature of between 80° and 95°C and for a period of approximately 20–30 minutes. After the cooking process, the meat is removed from the broth and is placed into containers with bottom perforations so that excess liquid can run off. Thereupon the meat is subjected to an initial comminution which, assuming that the quantity of meat involved amounts to 400 kg, requires approximately 8–10 minutes. The comminuted material now has salt, spices and liver pieces added to it, whereupon it is subjected to an additional comminution, a mixing action and an emulsifying action. The liver is admitted in a raw condition but must be subjected to preliminary comminution before it can be added to the comminuted meat, and must have binder material, such as starch or the like, added to it. When the secondary comminution after admission of the cold liver is completed, the resulting mixture has a temperature of approximately 30°–45°C. The secondary comminution requires approximately 4–8 minutes, if it is again assumed that the finished mixture has a weight of 400 kg.

Depending upon the degree of coarseness of fineness desired for the finished mixture, the latter may be subjected to additional comminution which will require approximately another 4 minutes for 400 kg of mixture.

Disregarding the time required for the runoff of excess water from the cooked pieces of pork belly, the production of 400 kg of mixture for liverwurst, liver paste or the like, requires approximately 32–48 minutes, which time will be increased to about 36–52 minutes if the mixture is to be subjected to subsequent fine comminution.

It is evident that the manufacturing time is quite substantial which, of course, has a disadvantageous effect on the economics involved in producing and selling these meat products. There is an additional disadvantage involved in the prior art, namely the fact that certain proteins, such as albumin, as well as fat and some of the aromatic substances, contained in the pork belly meat are cooked out of the meat during the scalding in the kettles and, therefore, are lost for the finished product. Particularly the loss of albumin is disadvantageous, because albumin is required to obtain binding of the finished product, that is to enable the finished product to become coherent. The loss of albumin therefore frequently makes it necessary that additional albumin be separately added after the cooking operation. Also, a certain amount of the water in which the pork bellies are cooked is absorbed by the meat and therefore raises the moisture content of the finished product.

Still another disadvantage is the fact that the liver which is to be added to the pork bellies must previously be separately comminuted, as pointed out earlier, which involves additional time and a separate operating step.

For the sake of completeness, it is pointed out that a cooked pig skin emulsion can also be produced by the steps outlined above, except that the time required for boiling the pig skins in kettles will be approximately 30–45 minutes, depending upon the characteristics of the pig skins and the degree of softness that is required of them. Of course, no liver will be added to such a pig skin emulsion.

SUMMARY OF THE INVENTION

It is an object of the present invention to provide an improved method which avoids the disadvantages of the prior art.

More particularly, it is an object of this invention to provide a method of making liverwurst, liver paste and analogous meat products in which the time required for producing a finished product is reduced as compared to the prior art.

Another object of the invention is to provide such a method in which the quality of the finished product is improved as compared to the prior art.

In keeping with these objects and with others which will become apparent hereafter, one feature of the invention resides in a method of making liverwurst, liver paste and the like, which comprises the steps of continuously agitating pork trimmings in a vacuum while subdividing them into a mass of chunks, and admitting saturated steam into the presence of the mass to cook the same while continuing the agitation. The cooking is terminated when the mass reaches a temperature of about 125°C, and thereupon the agitated mass is cooled to about 60°–95°C and is comminuted and emulsified while the agitation is continued. Liver pieces and binder material are then admitted into the emulsified mass which continues to be agitated, and comminution of the liver pieces is effected while continuing the agitation and further cooling the resulting mixture to about 40°–80°C. During this latter step, spices are admitted into the mixture to obtain a spiced product.

The spices are advantageously drawn into the mixture by applying a vacuum to the mixture and connecting the container in which the vacuum is produced to one or more sources of liquid spices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a flow diagram illustrating various steps of the present invention.

DESCRIPTION OF THE PREFERRED EMBODIMENTS

The FIGURE shows by way of a flow diagram how the present invention may be carried out according to one exemplary embodiment.

Pork meat, such as pork trimmings and in particular (but not exclusively) pork bellies, is admitted into a processing device at a temperature of approximately 5°–10°C. In this device, cutter knives rotate advantageously at about 1500 rpm and in a period of between substantially 2 and 4 seconds cut a charge of about 400 kg of pork meat into chunks of approximately fist size.

The comminutor vessel wherein the pork meat is being cut has been evacuated. After the cutting, saturated steam at a pressure of preferably about 6 atms and a temperature of approximately 164°C is admitted into the vessel. It heats and cooks the pork chunks which continue to be agitated during this cooking operation. The vessel is maintained under vacuum until the mass of pork chunks reaches a temperature of about 80°C; the cooking is continued until the mass reaches a temperature of about 125°C which requires a time of approximately 3–6 minutes, depending upon the steam and the initial temperature of the admitted pork meat.

When the mass of chunks reaches approximately 125°C, cooking is discontinued and the mass is cooled to approximately 60°–95°C while being continuously agitated. Cooling of the mass to the desired temperature requires approximately 4–10 minutes. Thereafter, the mass is subjected to comminuting, mixing and emulsifying which requires approximately 20–120 seconds, depending upon the desired degree of comminution. The comminuting and mixing tools of the equipment in which this step is carried out will advantageously be rotated at approximately 1500–3000 rpm. Whole liver chunks are now admitted into the mixture, together with binder material such as starch or the like that is conventionally used in the manufacture of liverwurst and analogous meat products, and further comminuting and mixing is carried out in order to comminute the liver pieces; depending upon the desired degree of comminution for the liver, this will take about 10–60 seconds and the comminuting tools will rotate at approximately 1500–3000 rpm. During this step, the mixture is maintained under vacuum and the vessel is connected with one or more sources of liquid spices which are drawn into it by the vacuum. The mixing-in of the spices requires approximately 2–4 seconds.

Once this last step is carried out, a finished product is available. If a particularly dense product is desired, the product obtained in the previous step may be further cooled to approximately 40°–80°C and may undergo further mixing under approximately 50% vacuum. The mixing time required for this amounts to about 30 seconds. If the finished product is to be particularly fine, the mixture may be passed through a fine comminutor which, will require approximately 3–4 minutes for 400 kg of mixture.

From the above description, it will be apparent that the time required to produce a finished product is between approximately 7.5 and 18.3 minutes, which may increase to between about 11 minutes and 22.8 minutes if the mixture undergoes subsequent mixing in a vacuum and fine comminution. When contrasted to the minimum time of 32 minutes and the maximum time of about 52 minutes required to produce the same amount of mixture in accordance with the prior art, it will be appreciated that the method of the present invention is substantially quicker and therefore more economical. Of course, all of the steps can be carried out in a single vessel of a single mixing and comminuting device, so that there is no need to move any of the intermediate products from one place to another, as is required in the prior art when the pork meat must first be cooked in kettles, thereupon be place into drip containers for running off of excess water, and must then be introduced into additional containers for further processing. Also, the liver does not have to undergo separate cutting or comminuting in the present method, so that the separate operating step required in the prior art is eliminated by the present invention.

By cooking the pork meat under vacuum and at high steam temperatures, I obtain a better binding of the finished mixture due to the avoidance of any losses of the natural albumin, and I also eliminate a loss in flavor.

The fact that the entire operation is carried out in a continuous process in a single vessel has not only the advantages outlined earlier, but additionally results in a more hygienic product and one which is less subject to spoilage, since the product has no contact whatever with ambient conditions or human beings from the beginning to the end of the manufacturing process. In fact, the finished product may be pumped directly out of the vessel in which it has been produced, and into a filling machine in which it is automatically filled into sausage casings, thereby eliminating another source of possible contamination by bacteria or the like.

It will be appreciated that one of the savings in time obtained by the present invention results from the use of high temperature steam at approximately 164°C. Moreover, by continuously subjecting the material at all stages of the process to agitation, and in particular by subjecting it to a revolving action of advantageously about 28 rpm in the vessel in which the process is being carried out, an excellent processing of the material is obtained. Due to this revolving action, every individual chunk of meat travels repeatedly past the steam inlet nozzles and therefore repeatedly comes in contact with the high temperature steam entering the vessel. This, in effect, subjects each chunk of meat to a thermal shock which has, inter alia, the advantage that the meat pores at the surface of the respective chunk are sealed in well-known manner so that no or almost no albumin and aromatic substances are lost.

If the vessel in which the process is carried out is of the double-walled type, and thus has a cooling jacket, the cooling at the various stages can be carried out by circulating cold water or brine through the cooling jacket.

The invention can also be used for producing other meat products, such as cooked pig skin emulsions. In that case the pig skin being cooked will be maintained at a 125°C temperature for a period of between substantially 3 and 6 minutes, depending upon the quality and characteristics of the pig skin, and, of course, the admission of spices and liver will be omitted.

It will be understood that each of the elements described above, or two or more together, may also find a useful application in other types of constructions differing from the type described above.

While the invention has been illustrated and described as embodied in a method of making meat products such as liverwurst, liver paste and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A rapid method of making liverwurst, liver paste and the like, comprising the steps of continuously agitating pork trimmings in a vessel while subdividing them into a mass of chunks of initial size; admitting saturated steam into the presence of the mass contained in said vessel to cook the mass while continuing the agitation; terminating the cooking when the mass in said vessel reaches a temperature of about 125°C, and thereupon cooling the agitated mass in said vessel to about 60°–95°C; maintaining a vacuum condition in said vessel until said mass has been heated to a temperature of about 80°C by said steam; comminuting and emulsifying the cooled mass in said vessel while continuing the agitation until said chunks are reduced to a final size smaller than said initial size; admitting liver pieces and binder material into the emulsified agitated mass in said vessel and effecting comminution of the liver pieces while continuing the agitation and further cooling the resulting mixture in said vessel to about 40°–80°C; and admitting spices into the mixture in said vessel to obtain a spiced product.

2. A method as defined in claim 1, wherein the step of admitting spices comprises drawing liquid spices into the presence of the mixture by application of a vacuum.

3. A method as defined in claim 1, and further comprising the additional step of further agitating and comminuting the spiced product in the presence of a partial vacuum.

4. A method as defined in claim 3, wherein said additional step is carried out for a period of about 30 seconds.

5. A method as defined in claim 3, wherein all of the steps are performed in a time period of approximately 11.0 – 22.8 minutes.

6. A method as defined in claim 1, wherein said agitation comprises subjecting the materials during the respective steps to a revolving motion of about 28 rpm.

7. A method as defined in claim 1, wherein the step of admitting saturated steam comprises admitting the steam at a pressure of about 6 atms and a temperature of about 164°C.

8. A method as defined in claim 1, wherein all of the steps are performed in a time period of approximately 7.5 – 18.3 minutes.

* * * * *